US006958785B2

(12) United States Patent
Orfitelli et al.

(10) Patent No.: US 6,958,785 B2
(45) Date of Patent: Oct. 25, 2005

(54) METHOD AND APPARATUS FOR DETERMINING AND CORRECTING FOR ILLUMINATION VARIATIONS IN A DIGITAL PROJECTOR

(75) Inventors: William A. Orfitelli, Pittsford, NY (US); William R. Markis, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 388 days.

(21) Appl. No.: 10/032,974

(22) Filed: Oct. 22, 2001

(65) Prior Publication Data

US 2003/0076419 A1    Apr. 24, 2003

(51) Int. Cl.⁷ .................. H04N 17/00; H04N 17/02; H04N 3/22; H04N 3/26
(52) U.S. Cl. .............. 348/745; 348/187; 348/189; 348/191; 348/246; 348/615; 348/657; 348/658; 348/813
(58) Field of Search ............... 348/745–747, 348/187–189, 191, 246, 615–617, 657–658, 348/813; H04N 17/00, 17/02, 3/22, 3/26

(56) References Cited

U.S. PATENT DOCUMENTS

| | | | | |
|---|---|---|---|---|
| 5,319,459 A | * | 6/1994 | Mochizuki et al. | 348/189 |
| 5,465,121 A | * | 11/1995 | Blalock et al. | 348/744 |
| 5,475,447 A | * | 12/1995 | Funado | 348/745 |
| 5,504,504 A | * | 4/1996 | Markandey et al. | 345/214 |
| 5,510,851 A | * | 4/1996 | Foley et al. | 348/658 |
| 5,680,588 A | | 10/1997 | Gortych et al. | |
| 5,793,441 A | | 8/1998 | Hagerman | |
| 5,838,396 A | | 11/1998 | Shiota et al. | |
| 5,918,192 A | * | 6/1999 | Tomaszewski | 702/85 |
| 6,061,102 A | | 5/2000 | Sheppard et al. | |
| 6,188,427 B1 | | 2/2001 | Anderson et al. | |
| 6,219,099 B1 | | 4/2001 | Johnson et al. | |
| 6,246,446 B1 | * | 6/2001 | Heimbuch et al. | 348/750 |
| 6,359,662 B1 | * | 3/2002 | Walker | 348/743 |
| 6,400,400 B1 | * | 6/2002 | Isnardi et al. | 348/180 |
| 6,456,339 B1 | * | 9/2002 | Surati et al. | 348/745 |
| 6,483,537 B1 | * | 11/2002 | Mayer et al. | 348/180 |
| 6,526,366 B1 | * | 2/2003 | Dunton | 702/116 |
| 6,593,961 B1 | * | 7/2003 | Perino | 348/187 |
| 6,618,115 B1 | * | 9/2003 | Hiroki | 349/192 |
| 6,628,329 B1 | * | 9/2003 | Kelly et al. | 348/252 |
| 6,642,971 B2 | * | 11/2003 | Takeuchi | 348/746 |
| 6,717,625 B1 | * | 4/2004 | Thielemans | 348/745 |
| 6,768,509 B1 | * | 7/2004 | Bradski et al. | 348/207.99 |
| 6,816,155 B1 | * | 11/2004 | Ogawa | 345/207 |
| 2002/0105579 A1 | * | 8/2002 | Levine et al. | 348/187 |
| 2002/0158977 A1 | * | 10/2002 | Hamilton | 348/246 |

* cited by examiner

*Primary Examiner*—Brian P. Yenke
(74) *Attorney, Agent, or Firm*—Stephen H. Shaw

(57) ABSTRACT

The need is met according to the present invention by providing a method of correcting pixel by pixel variations in a display, the method including the steps of creating a defect map of pixel intensity offsets for the display; correcting an input signal according to the defect map; and displaying the corrected input signal on the display, wherein the offset defect map is created by modulating a pixel in the display at a predetermined rate at a predetermined intensity; sensing the display with a photosensor to generate a sensed signal; demodulating the signal with a synchronous demodulator at the predetermined rate to produce a demodulated signal representing a sensed intensity; and employing the sensed intensity and the predetermined intensity to generate a correction offset.

8 Claims, 3 Drawing Sheets

METHOD AND APPARATUS FOR DETERMINING AND CORRECTING FOR ILLUMINATION VARIATIONS IN A DIGITAL PROJECTOR

FIELD OF THE INVENTION

The present invention relates to display devices, and more particularly to methods and apparatus for correcting for variations in the display devices.

BACKGROUND OF THE INVENTION

Digital projection systems can exhibit variations in gain and intensity (offset) from pixel to pixel. These variations can be due to variations in the driving electronics, the light modulator, the projection optics, the display screen, and the illumination optics. Electronic systems can be developed to correct for the variations by applying gain and offset correction values to each pixel. U.S. Pat. No. 6,061,102 issued May 9, 2000 to Sheppard et al. shows a target brightness map that is generated for each of a plurality of preselected shading application points and the target brightness map is used to correct the input signal to the display to remove variations in the display. The shading process is automatically performed during projector setup.

One problem with this approach is that the Sheppard et al. device uses a CCD sensor wherein each pixel in the sensor senses a large number of pixels in the display and is therefore unable to correct for variations in individual pixel intensity. There is a need therefore for an improved method and apparatus for correcting variations in display pixel intensity that avoids the problems noted above.

SUMMARY OF THE INVENTION

The need is met according to the present invention by providing a method of correcting pixel by pixel variations in a display, the method including the steps of creating a defect map of pixel intensity offsets for the display; correcting an input signal according to the defect map; and displaying the corrected input signal on the display, wherein the offset defect map is created by modulating a pixel in the display at a predetermined rate at a predetermined intensity; sensing the display with a photosensor to generate a sensed signal; demodulating the signal with a synchronous demodulator at the predetermined rate to produce a demodulated signal representing a sensed intensity; and employing the sensed intensity and the predetermined intensity to generate a correction offset.

ADVANTAGES

The method and apparatus of the present invention has the advantage of correcting for each pixel of the display. The components required are low cost, and correction data is collected for the entire electro-optical projection system.

DETAILED DESCRIPTION OF THE INVENTION

The present invention collects data on pixel gain and intensity using a simple sensor that collects light from the entire projected image. To obtain the correction data, all pixels are driven to black, or a predetermined level except for the pixel under observation. The pixel under observation is driven at a predetermined frequency that is preferably some fraction of the refresh rate of the display. A photosensor senses the entire display to produce a signal representing the light from the pixel. To increase sensor accuracy according to the present invention, the sensor is equipped with a synchronous demodulator that demodulates the signal at the predetermined frequency. The sensed intensity and the predetermined intensity are employed to generate an offset correction. The process is repeated for a plurality of intensities to generate a gain correction. The process is repeated for all pixels of the modulator and correction values created.

Figure 1:
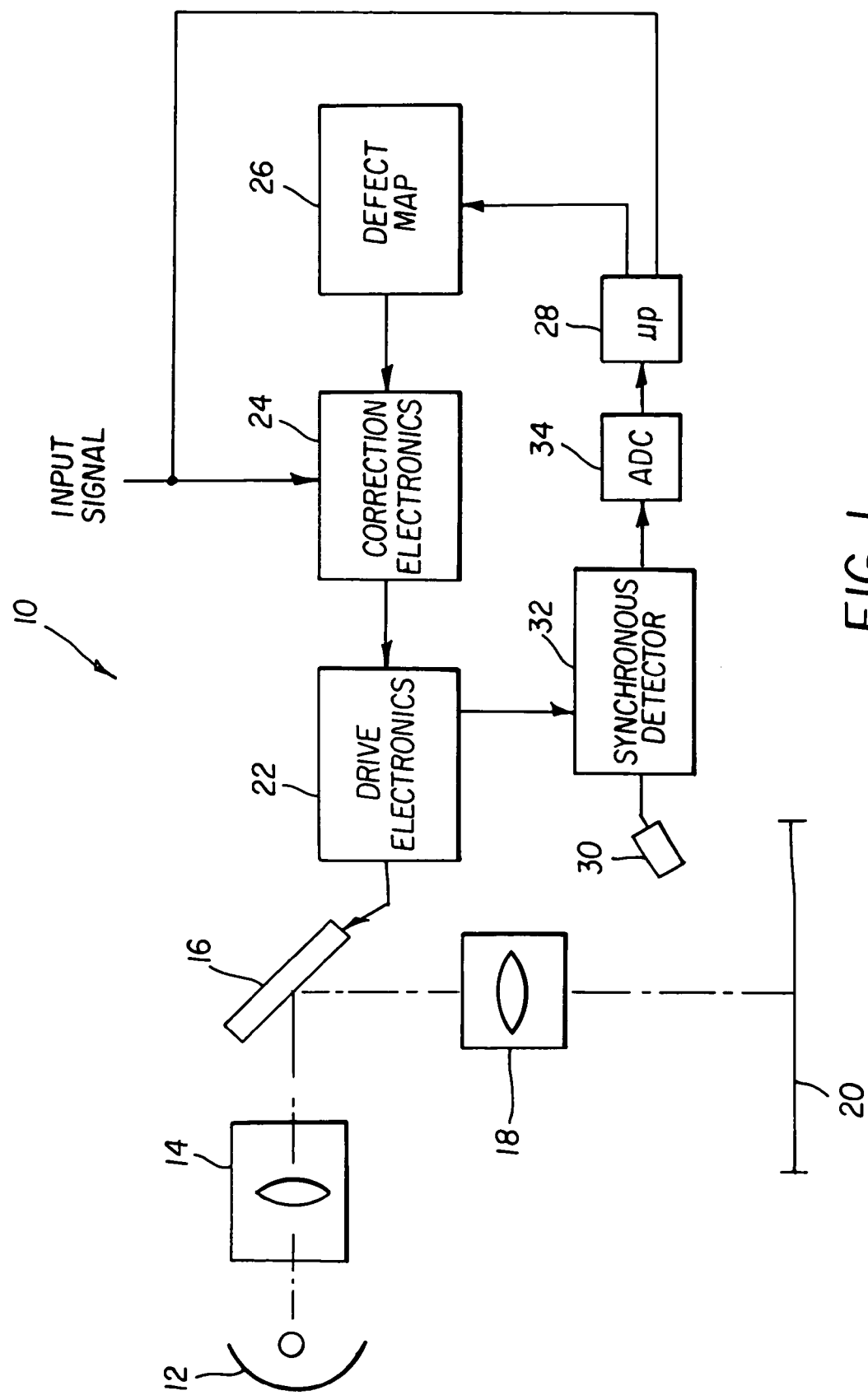
FIG. 1 is schematic diagram of a projection display system incorporating the correction method of the present invention.

Referring to FIG. 1, a projection display 10 according to the present invention includes a light source 12, such as a xenon projection lamp. The light from the light source 12 is conditioned by light source optics 14 to improve uniformity and color balance, remove heat, and concentrate the light onto the surface of a light modulator 16, such as the JVC DILA reflective liquid crystal light modulator. Light reflected from the light modulator 16 is directed to a display screen 20 by projection optics 18. Drive electronics 22 applies a corrected input signal to the light modulator 16. Correction electronics 24 applies a pixel by pixel correction to the input signal to correct for pixel by pixel variations in gain and offset. The corrections are stored in a defect map contained in a memory 26 such as a nonvolatile RAM.

According to the present invention, the corrections stored in the defect map are generated by driving one pixel at a time at a predetermined frequency. The signal for driving the pixel is generated, for example by a programmed microprocessor 28. A photosensor 30 is directed at the display screen 20, or alternatively at the projection optics 18 to generate a sensed signal. The sensed signal is detected by a synchronous detector 32 and converted to a digital signal by analog to digital converter 34. The digital detected signal is supplied to the microprocessor 28 where an intensity offset correction O is generated by comparing the signal sent to drive the pixel with the sensed demodulated signal. By driving the pixel at a predetermined frequency and sensing the detected signal with a synchronous demodulator at the predetermined frequency, the relatively weak signal produced by a single pixel can be efficiently detected in the presence of flare light and other noise that may corrupt the signal. The offset correction value O is recorded in the defect map. When the display is operating, the offset correction value O is added to the input pixel values that correspond to the pixels position on the display.

Figure 2:
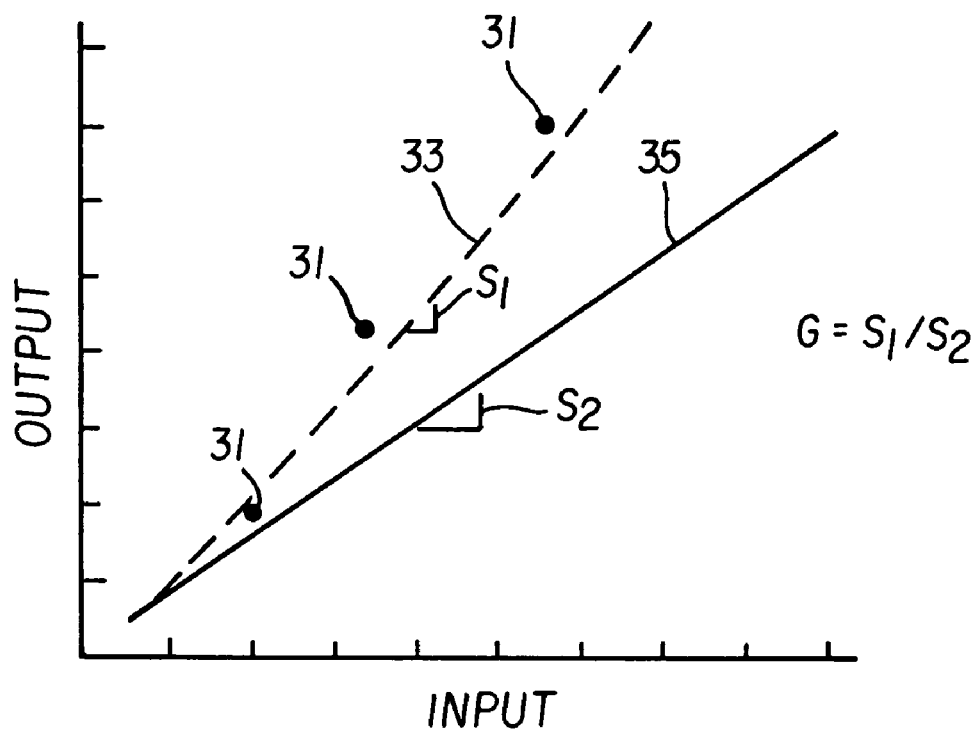
FIG. 2 is a graph illustrating the computation of a gain correction value according to one embodiment of the present invention.

Referring to FIG. 2, if the pixels in the display have gain variations, a gain correction value can also be generated by driving a pixel at several different input intensity levels and sensing the signal at each intensity level to produce a corresponding plurality of output values 31. A line is fit through the output values 31 to produce a gain curve 33. The slope $S_1$ of the gain curve 33 is the gain of the pixel. The ratio of the slope $S_2$ of an ideal gain curve 35 to the slope $S_1$ of the sensed gain is computed as a gain correction value G for the pixel. The gain correction value G is recorded in the defect map. When the display is operating, the input pixel values are multiplied by the gain correction values G that correspond to the pixels position on the display.

Figure 3:
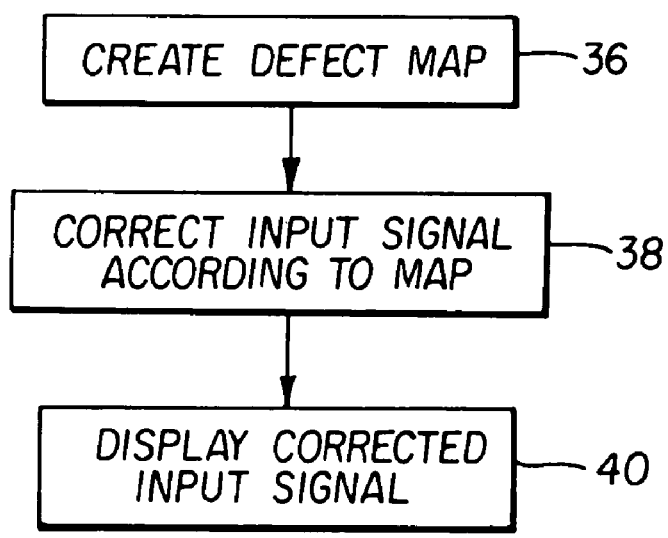
FIG. 3 is a flow chart illustrating the correction method according to the present invention.
Figure 4:
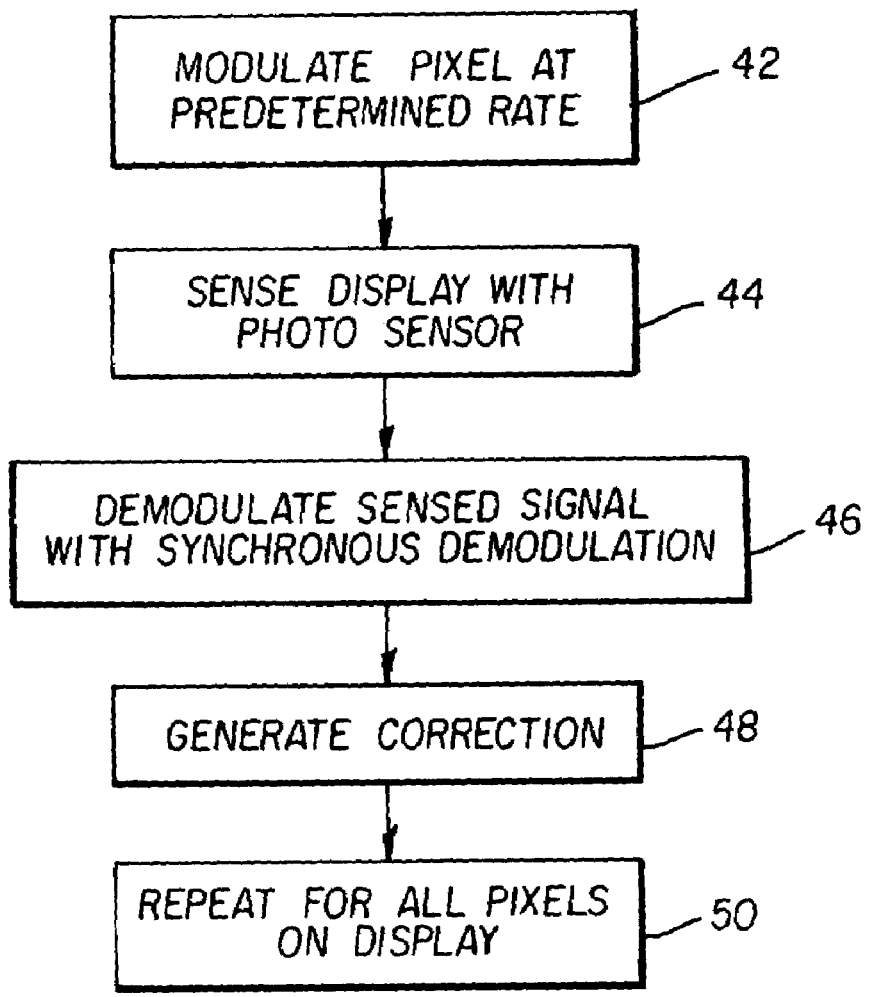
FIG. 4 is a flow chart illustrating the step of creating a defect map according to the present invention.

Referring to FIGS. 3 and 4, a method of using the apparatus of FIG. 1 according to the present invention will be described. First a defect map is created 36 that contains the corrections to be applied to all of the pixels of the display. The defect map is then used to correct 38 each pixel of the input signal to the display. Finally the corrected input signal is displayed 40. As shown in FIG. 4, the defect map is created by modulating 42 a single pixel at a predetermined rate and intensity while keeping all other pixels at zero or some predetermined level. The display is sensed 44 with a photosensor to generate a signal. The sensed signal is demodulated 46 with a synchronous demodulator, and a correction offset is generated 48 from the demodulated signal. The steps are then repeated 50 for every pixel in the display.

For simplicity, the method has been described with respect to one channel, however it will be understood that the method can be applied to each channel of a color display device. It will also be understood that a cluster of pixels can be modulated rather than a single pixel when typical defects in the display occur over regions that are greater than one pixel, thereby reducing the time to characterize the display.

The invention has been described in detail with particular reference to certain preferred embodiments thereof, but it will be understood that variations and modifications can be effected within the spirit and scope of the invention.

PARTS LIST 10 projection display
12 light source
14 light source optics
16 light modulator
18 projection optics
20 display screen
22 drive electronics
24 correction electronics
26 memory
28 programmed microprocessor
30 photosensor
31 output values
32 synchronous detector
33 gain curve
34 analog to digital converter
35 ideal gain curve
36 create defect map step
38 correct signal step
40 display corrected signal step
42 modulate single pixel step
44 sense display step
46 demodulate signal step
48 generated correction offset step
50 repeat for each pixel step

What is claimed is:

1. An improved method of correcting pixel by pixel variations in a display, including the steps of creating a defect map of pixel intensity offsets for the display; correcting an input signal according to the defect map; and displaying the corrected input signal on the display, wherein the improvement comprises: creating the offset defect map by:

a) modulating a single pixel in the display at a predetermined rate at a predetermined intensity;

b) sensing the display with a photosensor to generate a sensed signal;

c) demodulating the sensed signal with a synchronous demodulator at the predetermined rate to produce a demodulated sensed signal representing a sensed intensity; and d) employing the sensed intensity and the predetermined intensity to generate a correction offset;

e) repeating above steps for individual pixel until pixel-by-pixel variations in the display are corrected.

2. The method claimed in claim 1, wherein the defect map further includes pixel gain variations and the method includes the step of correcting the input signal for pixel gain variations, the improvement further comprising:

a) modulating the pixels at a plurality of predetermined intensity levels, and sensing and demodulating the sensed signals to produce a plurality of demodulated signals; and b) employing the plurality of sensed signals to generate a gain correction.

3. The method claimed in claim 1, wherein the display is a color display device and the method is applied to each color channel of the display device.

4. The method claimed in claim 1, wherein a cluster of pixels is modulated to generate a correction offset for the cluster.

5. A display device, comprising:

a) a light source;
b) a light modulator;
c) drive electronics for driving the light modulator with an input signal;
d) correction electronics for correcting the input signal on an individual pixel-by-pixel basis for intensity offset;
e) a memory for storing a defect map of pixel intensity offsets for the display;
f) means for modulating a pixel in the display at a predetermined rate at a predetermined intensity;
g) a photosensor for sensing the display to generate a sensed signal;
h) a synchronous demodulator for demodulating the sensed signal at the predetermined rate to produce a demodulated sensed signal representing a sensed intensity; and
i) means employing the sensed intensity and the predetermined intensity for generating the intensity offset.

6. The display claimed in claim 5, wherein the correction electronics further includes means for correcting the input signal on a pixel-by-pixel basis for gain, and further comprising means for modulating the pixel at a plurality of predetermined intensities at the predetermined frequency and means for generating a gain correction.

7. The display claimed in claim 5, wherein the means for modulating modulates a cluster of pixels in the display.

8. A improved method of correcting pixel by pixel variations in a display, including the steps of creating a defect map of pixel intensity offsets for the display; correcting an input signal according to the defect map; and displaying the corrected input signal on the display, wherein the improvement comprises: creating the offset defect map by:

a) driving all pixels to black or a predetermined intensity level except for a single cluster of pixels that are observed for defects;

b) modulating the single cluster of pixels in the display at a predetermined rate at a predetermined intensity;

c) sensing the display with a photosensor to generate a sensed signal;

d) demodulating the sensed signal with a synchronous demodulator at the predetermined rate to produce a demodulated sensed signal representing a sensed intensity;

e) employing the sensed intensity and the predetermined intensity to generate a correction offset; and f) repeating above steps for individual clusters of pixels until pixel-by-pixel variations in the display are corrected.

* * * * *